W. P. MARSHALL.
MUZZLE FOR DOGS AND OTHER ANIMALS.
APPLICATION FILED JULY 17, 1908.
912,703.
Patented Feb. 16, 1909.
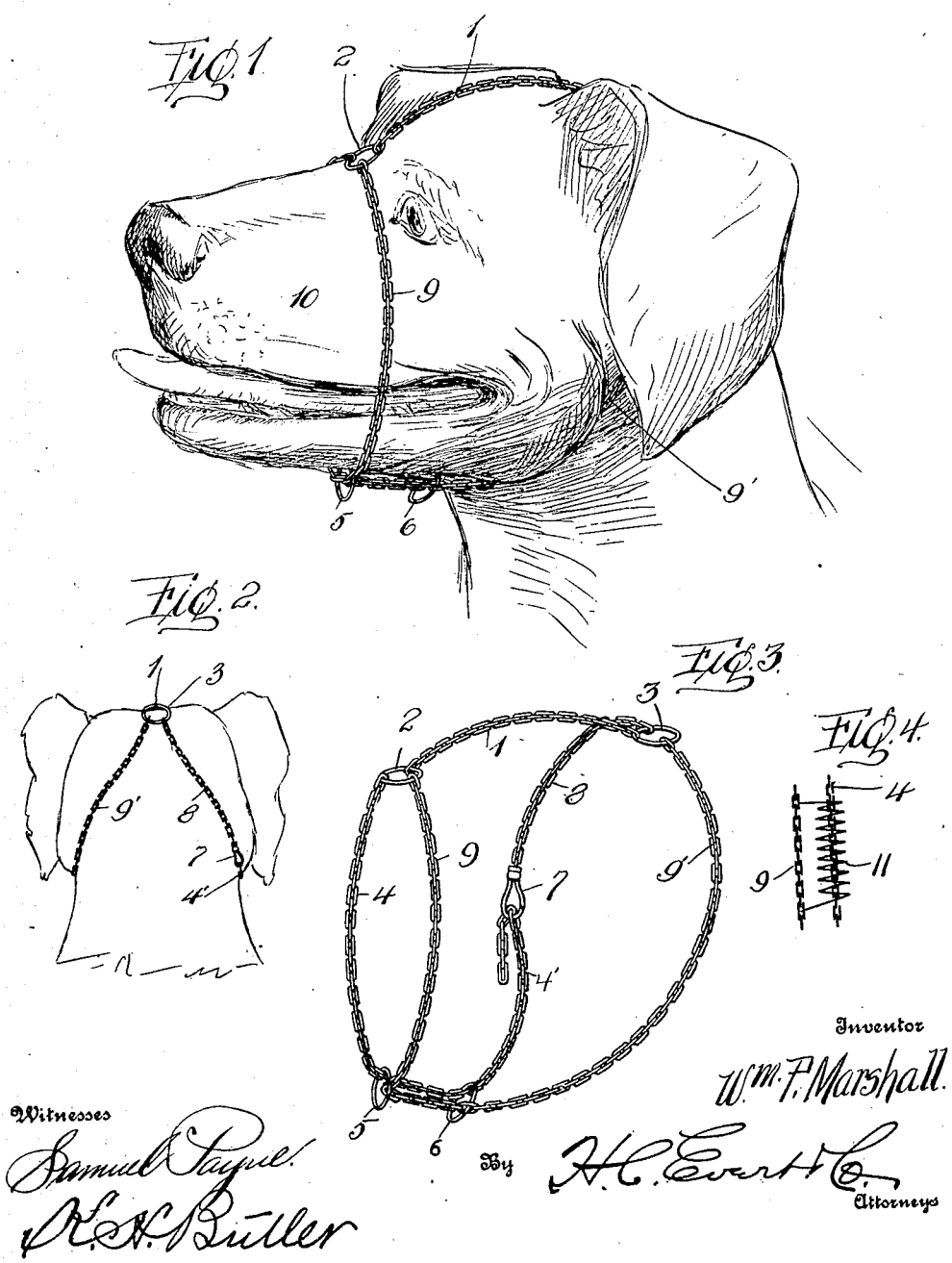
Witnesses
Samuel Payne
R. H. Butler
Inventor
Wm. P. Marshall
By H. C. Evert & Co.
Attorneys

UNITED STATES PATENT OFFICE.

WILLIAM P. MARSHALL, OF PITTSBURG, PENNSYLVANIA.

MUZZLE FOR DOGS AND OTHER ANIMALS.

No. 912,703.  Specification of Letters Patent.  Patented Feb. 16, 1909.

Application filed July 17, 1908. Serial No. 444,020.

*To all whom it may concern:*

Be it known that I, WILLIAM P. MARSHALL, a citizen of the United States of America, residing at Pittsburg, in the county of Allegheny and State of Pennsylvania, have invented certain new and useful Improvements in Muzzles for Dogs and other Animals, of which the following is a specification, reference being had therein to the accompanying drawing.

This invention relates to muzzles for dogs and other animals, and the primary object of my invention is to provide a simple and inexpensive muzzle that can be easily placed upon a dog, to prevent the dog from biting, but at the same time allow the dog's mouth to open sufficiently to drink or pant.

A further object of this invention is to provide a strong and durable muzzle that can be easily and quickly adjusted for dogs of various sizes, the muzzle occupying comparatively small space when not in use.

A still further object of this invention is to provide a muzzle that will be neat in appearance and will not hurt a dog, except when the animal tries to bite.

With the above and other objects in view which will more readily appear as the invention is better understood, the same consists in the novel construction, combination and arrangement of parts to be presently described and then specifically pointed out in the appended claims.

Referring to the drawings:—Figure 1 is a perspective view of my muzzle as applied to the head of a dog, Fig. 2 is a rear elevation of the muzzle, as applied, Fig. 3 is a perspective view of a muzzle detached, and Fig. 4 is an elevation of a portion of the muzzle, illustrating a modification of the invention.

A muzzle constructed in accordance with my invention, is preferably formed of a plurality of light weight metallic chains, so connected together as to form the muzzle, and capable of being adjusted so as to increase or decrease the size of the muzzle as may be required or desired.

To construct the muzzle, I provide what I herein term as a head-chain 1, provided with a front ring or link 2 and a rear ring or link 3. This head-chain is adapted to lie along the top of the head of the animal, as clearly shown in Fig. 1. Connected to the forward ring or link 2 is one end of a nose chain 4, the rear portion 4' of which constitutes in connection with a chain 8, one of the jaw chains of the muzzle. The said chain 8 is carried by the rear ring or link 3 of the head-chain 1, and, at its free end, carries a snap 7 which may be connected to any of the links of the jaw portion 4' of said chain 4. A third chain is provided, the portion 9 of which constitutes a nose chain which is opposed to the nose chain 4, and is connected to the front ring or link 2. The other end of this third chain is connected to the rear ring or link 3 of the head chain, and the portion 9' of said third chain constitutes the jaw chain which is opposed to the jaw chain formed by chain 4' and chain 8.

The chain from which the nose engaging portion 9 and the jaw engaging portion 9' are formed carries rings 5 and 6 through which the chain constituting the nose engaging portion 4 and the jaw engaging portion 4' is passed, these rings serving to bring the chains together beneath the lower jaw of the animal, and holding the muzzle upon the head of the animal, as clearly shown in Fig. 1.

It will be evident that by adjusting the rings 5 and 6, the size of the loops may be varied, as may be required to adjust the device to fit the head of the animal on which it is desired to use the same. The snap 7 may be connected with any of the links of the chain 4' to secure the device firmly in position on the animal's head.

Fig. 4 shows a modification of the invention, wherein in lieu of the rings 5 and 6, there is provided a coil spring 11 which is attached to the links of the chain 9, through which the chain 4 is loosely extended.

The muzzle is made of a light and durable metallic chain that can be nickel-plated to produce a neat appearance.

Having now described my invention what I claim as new, is:—

1. A muzzle formed from a plurality of loosely connected chains, one of said chains constituting a head-chain, and provided at each end with a ring, another of said chains connected at one end to the forward ring of the head chain and constituting a nose chain, a chain carried by the ring on the rear end of said head chain and detachably connected to said nose chain, a third chain connected at its rear end to the ring of the rear end of said head chain, and at its forward end to the front ring of said head chain, and rings carried by said last mentioned chain through which the nose chain is passed.

2. A muzzle formed of a plurality of chains, one of which constitutes a head chain and is provided at each end with a ring, two combined nose and jaw chains both of which are connected at their forward ends to the front ring of the head chain and one of which is connected at its rear end to the rear ring of said head chain, a chain carried by said rear ring of the head chain and detachably connected to the other combined nose and jaw chain, and means carried by one of said combined nose and jaw chains for receiving the other nose and jaw chain for clasping the chains together beneath the jaws of the animal.

In testimony whereof I affix my signature in the presence of two witnesses.

WILLIAM P. MARSHALL.

Witnesses:
    MAX H. SROLOVITZ,
    C. V. BROOKS.